United States Patent [19]
Gouessant

[11] Patent Number: 5,920,806
[45] Date of Patent: Jul. 6, 1999

[54] TELEPHONE SYSTEM WITH PERIPHERAL DEVICE

[75] Inventor: Hervé Gouessant, Paris, France

[73] Assignee: U.S. Philips Corporation, New York, N.Y.

[21] Appl. No.: 08/721,922

[22] Filed: Sep. 27, 1996

[30] Foreign Application Priority Data

Sep. 29, 1995 [FR] France .................................. 95 11500

[51] Int. Cl.⁶ .................................................... H04B 7/00
[52] U.S. Cl. ............................ 455/66; 455/557; 348/552
[58] Field of Search ........................... 455/66, 556, 557; 348/552; 379/102.03

[56] References Cited

U.S. PATENT DOCUMENTS

| 4,356,509 | 10/1982 | Skerlos et al. ........................... 348/552 |
| 5,349,638 | 9/1994 | Pitroda et al. ........................... 379/142 |
| 5,396,546 | 3/1995 | Remillard ................................... 379/96 |
| 5,542,102 | 7/1996 | Smith et al. ............................... 455/66 |

FOREIGN PATENT DOCUMENTS

| 2710807 | 4/1995 | France . |
| 4321304A1 | 3/1995 | Germany ......................... H04Q 9/00 |
| 6-14370 | 1/1994 | Japan . |

Primary Examiner—Andrew M. Dollnar
Attorney, Agent, or Firm—Jack D. Slobod

[57] ABSTRACT

A telephone system includes a base station (2), at least one mobile station (3), and a special peripheral device (6) which is adapted to cooperate with a TV set (4) in a hands-free telephone mode and includes audio signal processing means and means (8) for communicating with the base station by radio. The peripheral device has a cord (9) for connection to the TV set (4) via a SCART connector, for using at least the loudspeaker of the TV set in the hands-free telephone mode, and it further includes a microphone (12) provided with an anti-Larson device, and a detector (13) for receiving infrared signals from a special remote control device (5) capable of controlling both the peripheral device (6) itself and the TV set (4).

20 Claims, 2 Drawing Sheets

TELEPHONE SYSTEM WITH PERIPHERAL DEVICE

BACKGROUND OF THE INVENTION

1. Field of the Invention

The present invention relates to a telephone system comprising a first stationary part called the base station, for emitting/receiving signals and adapted to be coupled to a telephone line, and at least one part accommodated in a mobile housing, called the mobile station, which mobile station includes audio signal processing means and means for communicating with the base station by radio.

The invention also relates to a special peripheral device for a telephone system of the type defined above.

2. Description of the Related Art

Cordless telephone sets have been known for several years. Owing to the radio link between the mobile handset and the base station in the user's home these sets provide a high flexibility because they permit incoming or outgoing calls to be made in a range of some tens of meters around the base station.

Apart from the greater freedom in making telephone calls, this new type of product from now on also enables other technical problems, which may occur under special conditions of use of the telephone, to be solved at low cost, which is the aim of the present invention.

One of these special conditions of use is the wish to make telephone calls or to be ready to receive a call while watching television and listening to it. The operations to be carried out in such a case is to turn down the volume of sound of the television set and to access the telephone set. The invention proposes to solve this general technical problem with the least possible inconvenience, it being assumed that the user has a multi-channel cordless telephone.

From the Japanese Patent 6-14370 (A) a cordless telephone is known by means of which the above-mentioned problem can be solved. For this purpose, one of the mobile handsets also comprises an infrared remote control device for a television receiver.

The present invention proposes an additional advance in order to solve the afore-mentioned technical problem.

OBJECT AND SUMMARY OF THE INVENTION

It is an object of the invention to enable incoming or outgoing telephone calls to be made by means of an infrared remote control device.

Another object is to utilize the loudspeaker and the screen of a television set, without the need to modify them, in order to achieve telephone communication with the highest degree of convenience.

These objects are achieved and the drawbacks of the prior art are mitigated owing to the fact that the system of the type defined in the opening paragraph is characterized in that it comprises a second stationary part, called the peripheral device, comprising audio signal processing means and means for communicating, on the one hand, with the base station and, on the other hand, with a television receiver, called the TV set, for at least using the loudspeaker of the TV set in a hands-free mode, said peripheral device further comprising a microphone and means for receiving infrared signals from a special remote control device capable of controlling both said peripheral device and said TV set.

The remote control device to be used is of a universal type, i.e. which not only enables the television set but also a special peripheral device of the television receiver to be controlled, by actuation of a "telephone" button, which peripheral device essentially has the structure of a hand set of a cordless telephone. In particular, the digit keys of the remote control device for the selection of television programs also serve for dialing telephone numbers, while remote control of any other peripheral device of the television receiver, such as for example a video recorder, remains possible. The construction of the special remote control device for carrying out the present invention is obvious to those skilled in the art.

The peripheral device may have batteries or rechargeable batteries for its electrical power supply. Preferably, it comprises an electrical cord to be connected to the electric mains for its power supply. It can also be integrated either in the base station or in the television receiver.

In a preferred embodiment of the invention the peripheral device comprises a modulator adapted to supply a preprogrammed ringing signal to said loudspeaker of the TV set in response to an incoming telephone call.

In another preferred embodiment of the invention the peripheral device comprises first means for displaying information about the caller identity on the screen of said TV set.

In another preferred embodiment of the invention the peripheral device comprises second display means for displaying on the screen of said TV set information relating to the configuration of the operation of the telephone as selected by the user, to the telephone directory of the user, or to the sound control of an anti-Larson device.

How the invention can be carried into effect will be more fully understood by means of the following description with reference to the accompanying drawing, given by way of non-limitative example.

DETAILED DESCRIPTION OF THE PREFERRED EMBODIMENT

Figure 1:
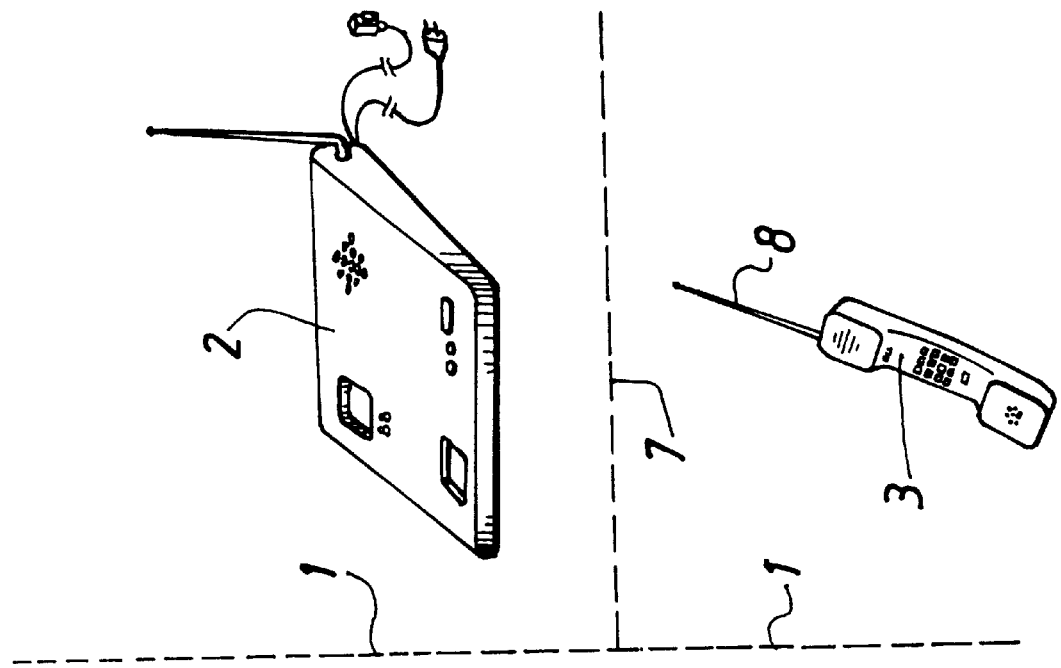
FIG. 1 shows the telephone system in accordance with the invention as separate elements.
Figure 1:
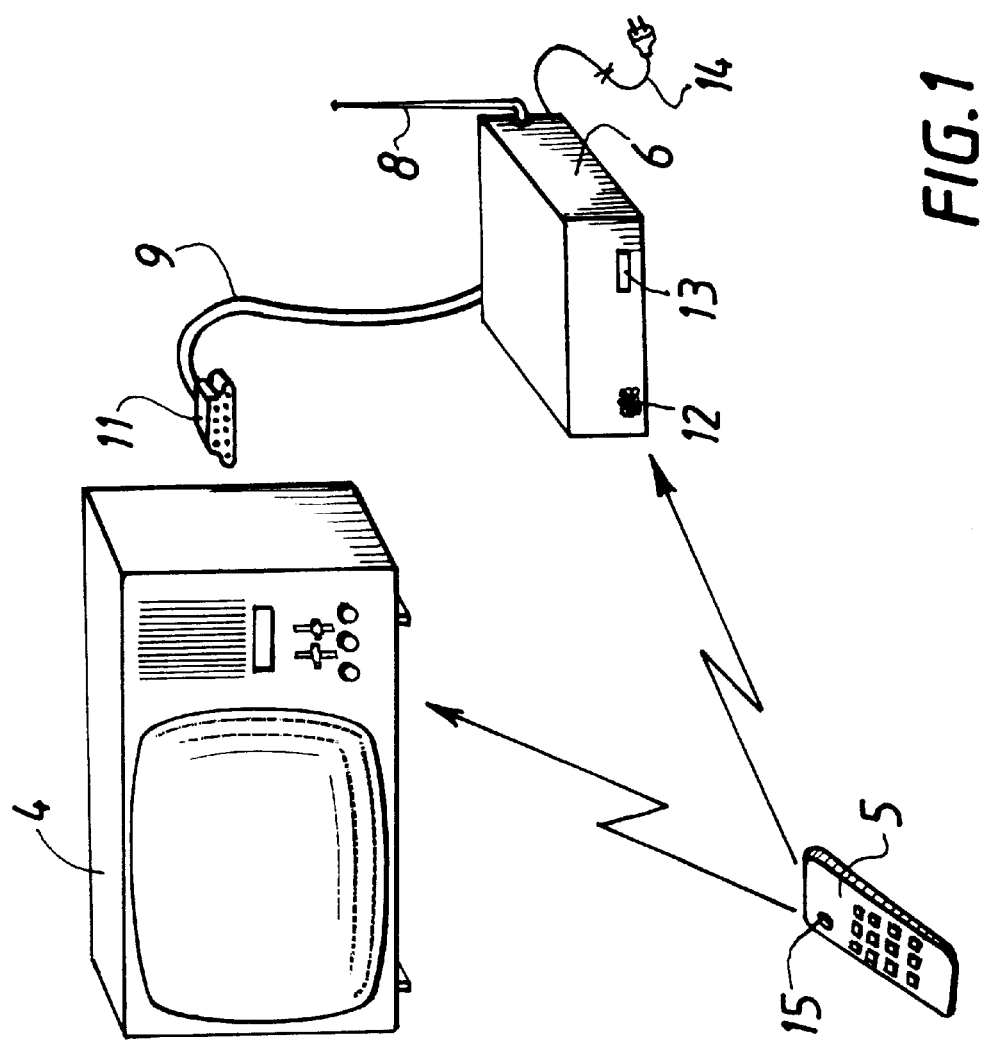

The elements necessary for carrying out the invention are shown in FIG. 1. These include, to the right of the broken line 1, a multi-channel cordless telephone set, for example Philips TD 9203, of which the base station 2 and one of the mobile handsets 3 are shown, the base station and the handset each having an antenna for communication by radio waves. Shown to the left of the line 1 is a television receiver 4 having a SCART connector (not shown in the Figure), with its infrared (IR) remote control device 5 and a peripheral element 6 of the television receiver, hereinafter referred to as the peripheral device. The known elements 2, 3 and 4 are assumed to be already at the disposal of a potential user and they are typically assumed to be situated at different locations, i.e.: in the house for the handset 3, in one room for the base station 2 and in another room for the television receiver 4, as indicated symbolically by means of the broken lines 1 and 7.

As is shown in FIG. 1, the peripheral device 6 has an antenna 8, a cord 9 provided with a SCART connector 11 to be connected to that of the television receiver 4, a microphone 12 and a central IR receiver 13. For its power supply, which can be provided by batteries or rechargeable batteries, the peripheral device 6 preferably comprises an electric cord 14 to be connected to the electric mains.

The remote control device 5 is of a universal type, i.e. it not only enables the television set but also a special peripheral element of the television receiver, the peripheral device 6, to be controlled, by actuation of a "telephone" button 15, which peripheral device in the present case essentially has the structure of a handset of a cordless telephone. In particular, the digit keys of the IR remote control device 5 for the selection of television programs also serve for dialing telephone numbers, while remote control of any other peripheral device of the television receiver 4, such as for example a video recorder, remains possible. The construction of the special remote control device for carrying out the present invention is readily apparent to those skilled in the art.

The microphone 12 of the peripheral device 6, which is intended for telephone communication in a hands-free mode, preferably comprises an anti-Larson device which can be constructed by those skilled in the art.

The peripheral device 6 essentially has the structure of the mobile handset 3 described hereinafter with reference to FIG. 2.

The handset 3 comprises a transmit-receive antenna 8, a radio signal processing block 21, a microprocessor 22 with an analog interface 23, and a keyboard 24 by means of which the telephone functions can be implemented. A microphone 25 and a loudspeaker 26 are connected to the interface 23, which comprises an anti-sidetone device. When lit, a LED 27 indicates that the line is engaged. A power supply 28 supplies the necessary power to the blocks 21 and 22.

Figure 2:
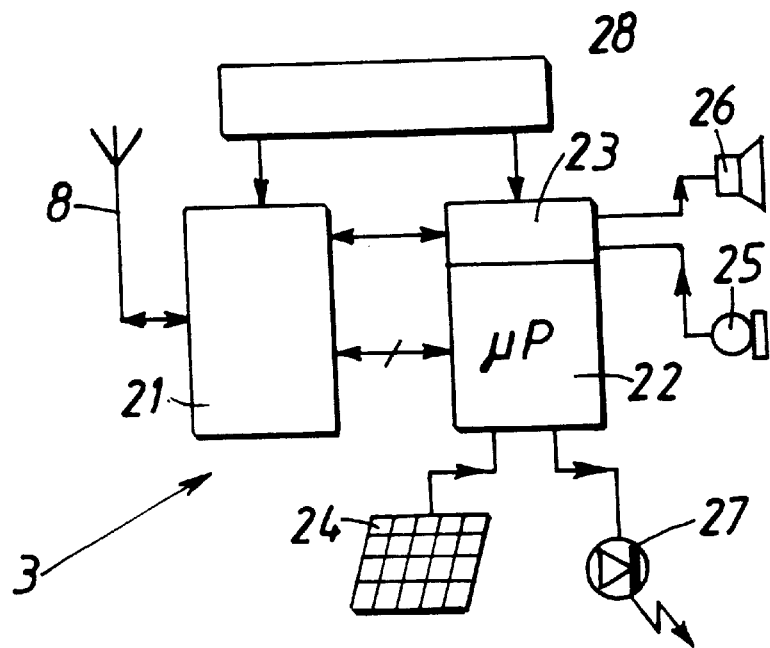
FIG. 2 is the block diagram of a known receiver (or mobile handset) of a cordless telephone set.
Figure 3:
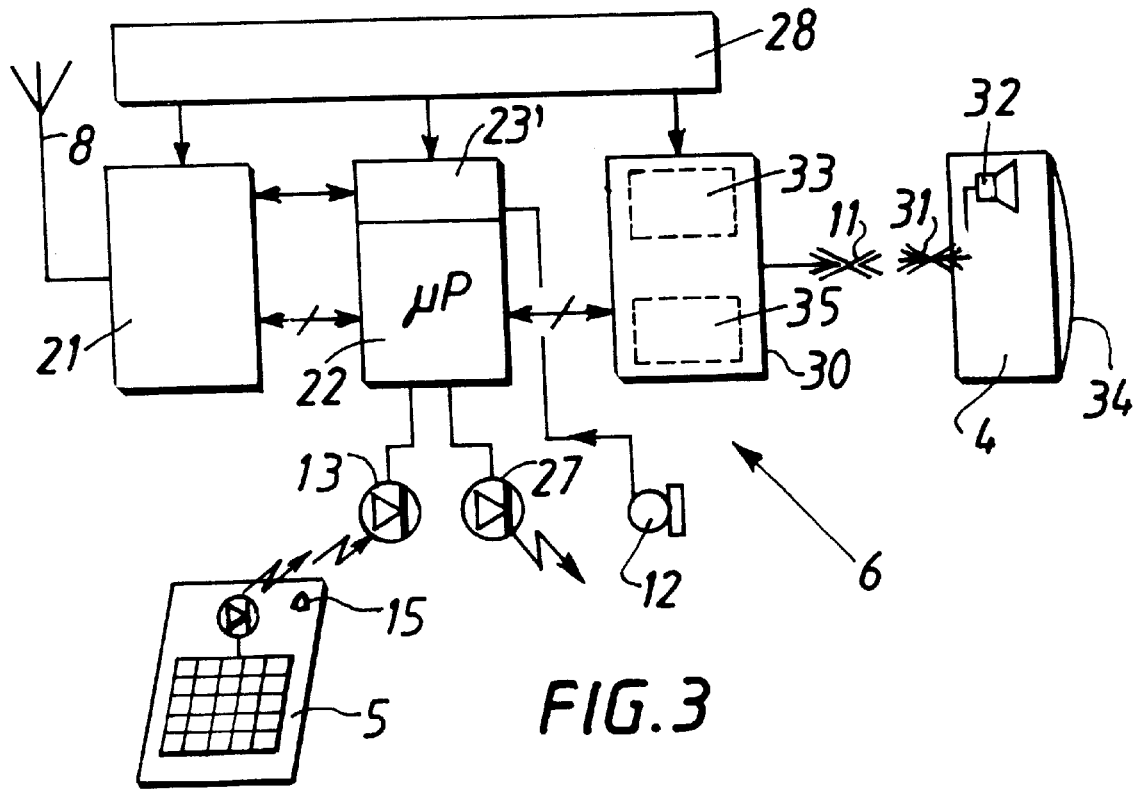
FIG. 3 is the block diagram of an embodiment of the peripheral device of a television receiver for a telephone system in accordance with the invention.

In FIG. 3, which shows the peripheral device 6 with its IR remote control device 5, the principal elements of FIG. 2 can be found with the same functions: 8, 21, 22, 23, 27, 28. The power supply 28, however, is preferably connected to the electric mains by a cord.

In FIG. 3, however, the keyboard has been transferred, the commands being given at the IR remote control device 5, which is also the remote control device of the television receiver 4. At 23' the microphone 12 comprises a hands-free anti-Larson device, not shown. The peripheral device 6 further comprises an additional block 30 connected to the power supply 28, which serves as a two-way interface between the microprocessor 22 and the male part 11 of the SCART connector, whose female part 31 is situated on the television receiver 4.

The handset of FIG. 3, which includes at least the loudspeaker 32 of the television receiver 4, is adapted to operate in the hands-free mode by means of the IR remote control device 5.

In an embodiment which is compatible with the preceding one, the ringing signal of an incoming call can be routed to the loudspeaker 32 in that in the interface block 30 a ringing signal modulator 33 is added whose output signal is transferred to the loudspeaker 32 via an audio input channel of the SCART connector.

For an incoming call the functions, which can be realized very easily by means of the handset shown in FIG. 3, which handset can also be realized readily by those skilled in the art on the basis of the present level of disclosure, are:

the ringing function by routing this special telephone information to the loudspeaker 32 via the elements: 8, 21, 22, 30, 11–31, connection to the line in that the user presses the "telephone" button 15 of the IR remote control device 5 and subsequently the button "off-hook" (not shown). The connection to the line causes the LED 27 to light up, while at the same time the loudspeaker 32 is switched from the television receiver to the telephone. Now communication is possible in a hands-free mode. Speech is transmitted via the microphone 12 under control of the "hands-free" anti-Larson device. To hang-up it suffices to press the button "television" on the device 5, as a result of which the entire device is reset to the initial state, i.e. to the "television mode and the telephone section of the system shown in FIG. 3 is reset to the standby state. An outgoing call is just as ergonomic as an incoming call:

pressing the button 15 on 5, dialling the desired number on 5, connection to the line may subsequently result in the LED 27 being lit and the voice of the person answering the call being reproduced by the loudspeaker 32, in the same way as for an incoming call, at the end of the communication hanging-up off in the same way as for an incoming call.

The handset shown in FIG. 3 may advantageously be provided with video functions using display on the screen 34 of the television receiver. These functions can be implemented by means of a dedicated microprocessor 22, an optional block 35 display control belonging to the interface block 30 and the video input channels of the SCART connector. The video technique used for display on the screen 34 is preferably the OSD (On Screen Display) technique, which enables text to be displayed on a part of the screen 34. For this purpose, the block 35 includes for example a circuit PCA 8515/003 manufactured by the Philips company, by means of which up to 192 characters can be displayed; this circuit in 35 should be used in conjunction with a sync extraction circuit, for example Philips TDA 4691, which receives the composite video signal from the television receiver 4 via the SCART connector 31–11.

The video functions to be performed may include:

incoming call with caller identification (Caller ID), personal notebook, stored at 35, in the peripheral device 6, management of the personal notebook, programming of the options selected by the user for the configuration of the operation of his telephone system, such as ringing (yes or no), ringing rhythm; anti-Larson setting. . . .

It is to be noted that for an optimum operation of the devices with the video functions described above the base station 2 requires a modem for decoding the caller identification (caller ID).

For further information about the video functions which can be controlled by means of an IR remote control device in the case of on-screen display on the TV screen, reference is made to French Patent 2,710,807.

The hands-free cordless telephone which can be controlled by means of the infrared remote control device and which incorporates a television receiver is particularly useful for persons tied to a wheelchair or bound to stay in the room.

The invention is not limited to the embodiments described above, several other variants being possible. In particular, the peripheral device 6, which in the foregoing has been described as a separate element, can also be integrated either in the television receiver or in the base station 2. In the case that the peripheral device is integrated in the base station, the radio link between them is no longer necessary but, in order maintain the possibility of controlling the peripheral device from the infrared remote control device 5, it is necessary that the television receiver and the base station are situated in the same room. In the alternative case that the peripheral device is integrated in the television receiver, the cord 9 with a SCART connector and the electric cord 14 are no longer necessary.

I claim:

1. A telephone system comprising:
   a first stationary part called the base station, for emitting/receiving signals and adapted to be coupled to a telephone line;
   at least one part accommodated in a mobile housing, called the mobile station, which mobile station comprises audio signal processing means and means for communicating with the base station by radio; and
   a second stationary part, called the peripheral device, comprising audio signal processing means and means for communicating, on the one hand, with the base station by radio and, on the other hand, with a television receiver, called the TV set, via a wired connection between the peripheral device and the TV set for at least using the loudspeaker of the TV set in a hands-free mode, said peripheral device further comprising a microphone and means for receiving infrared signals from a special remote control device capable of controlling both the peripheral device itself and the TV set.

2. A telephone system as claimed in claim 1, further comprising an electrical cord for power supply to the peripheral device from electric mains.

3. A telephone system as claimed in claim 2, further comprising a modulator adapted to supply a preprogrammed ringing signal to the loudspeaker of the TV set in response to an incoming telephone call.

4. A telephone system as claimed in claim 3, wherein the telephone system is adapted to detect caller identification, and the peripheral device comprises display control means for using the screen of the TV set for displaying information about caller identity.

5. A telephone system as claimed in claim 3, further comprising display control means for using the screen of the TV set for displaying information relating to configuration of operation of the telephone as selected by the user, to a telephone directory of the user, or to sound control of the anti-Larson device.

6. A telephone system as claimed in claim 2, wherein the telephone system is adapted to detect caller identification, and the peripheral device comprises first display control means for using the screen of the TV set for displaying information about caller identity.

7. A telephone system as claimed in claim 6, wherein said first display control means are for using the screen of the TV set to produce a display of the OSD (on-screen display) type, using image overlay on the screen of said TV set.

8. A telephone system as claimed in claim 7, further comprising second display control means for using the screen of the TV set for displaying information relating to configuration of operation of the telephone as selected by the user, to a telephone directory of the user, or to sound control of the anti-Larson device.

9. A telephone system as claimed in claim 6, further comprising second display control means for using the screen of the TV set for displaying information relating to configuration of operation of the telephone as selected by the user, to a telephone directory of the user, or to sound control of the anti-Larson device.

10. A telephone system as claimed in claim 2, further comprising display control means for using the screen of the TV set for displaying information relating to configuration of operation of the telephone as selected by the user, to a telephone directory of the user, or to sound control of the anti-Larson device.

11. A special peripheral device for a telephone system comprising a base station and at least one mobile station, the peripheral device being adapted to cooperate with a TV set in a hands-free telephone mode, and comprising audio signal processing means and means for communicating on the one hand, with the base station by radio, and on the other hand with said TV set via a cord and a SCART connector, for at least using the loudspeaker of the TV set in a hands-free mode, and further comprising a microphone provided with an anti-Larson device, and means for receiving infrared signals from a special remote control device capable of controlling both the peripheral device itself and the TV set.

12. A peripheral device for a telephone system as claimed in claim 11, further comprising an electrical cord for power supply to the peripheral device from electric mains.

13. A peripheral device for a telephone system as claimed in claim 12, further comprising a modulator adapted to supply a preprogrammed ringing signal to the loudspeaker of the TV set in response to an incoming telephone call.

14. A peripheral device for a telephone system as claimed in claim 12, wherein the telephone system is adapted to detect caller identification, and the peripheral device comprises first display control means for using the screen of the TV set for displaying information about caller identity.

15. A peripheral device for a telephone system as claimed in claim 14, wherein said display control means are for using the screen of the TV set to produce a display of the OSD (on-screen display) type, using image overlay on the screen of said TV set.

16. A telephone system comprising:
    a first stationary part called the base station, for emitting/receiving signals and adapted to be coupled to a telephone line;
    at least one part accommodated in a mobile housing, called the mobile station, which mobile station comprises audio signal processing means and means for communicating with the base station by radio; and
    a second stationary part, called the peripheral device, comprising audio signal processing means and means for communicating, on the one hand, with the base station by radio, on the other hand, with a television receiver, called the TV set, via a cord and a SCART connector, for at least using the loudspeaker of the TV set in a hands-free mode, said peripheral device further comprising a microphone, an anti-Larson device, and means for receiving infrared signals from a special remote control device capable of controlling both the peripheral device itself and the TV set.

17. A telephone system as claimed in claim 16, further comprising an electrical cord for power supply to the peripheral device from electric mains.

18. A telephone system as claimed in claim 17, further comprising a modulator adapted to supply a preprogrammed ringing signal to the loudspeaker of the TV set in response to an incoming telephone call.

19. A telephone system as claimed in claim 17, wherein the telephone system is adapted to detect caller identification, and the peripheral device comprises display control means for using the screen of the TV set for displaying information about caller identity.

20. A telephone system as claimed in claim 17, wherein said display control means are for using the screen of the TV set to produce a display of the OSD (on-screen display) type, using image overlay on the screen of said TV set.

* * * * *